United States Patent [19]
Slaats et al.

[11] 3,973,455
[45] Aug. 10, 1976

[54] SAW

[75] Inventors: Mathew A. Slaats; J. Richard Slayton, both of Jasper, Ind.

[73] Assignee: Kimball International, Inc., Jasper, Ind.

[22] Filed: Mar. 10, 1975

[21] Appl. No.: 556,706

[52] U.S. Cl. ............................... 83/56; 83/846; 83/851; 76/101 A
[51] Int. Cl.² ................................. B27B 33/08
[58] Field of Search ............ 83/835, 846, 851, 852; 76/101 A

[56] References Cited
UNITED STATES PATENTS

| | | | |
|---|---|---|---|
| 2,890,728 | 6/1959 | Craven | 83/846 |
| 3,651,841 | 3/1972 | Ohlsson | 83/835 X |
| 3,712,348 | 1/1973 | Kulik et al. | 83/835 |
| 3,730,038 | 5/1973 | Farb | 83/835 X |

FOREIGN PATENTS OR APPLICATIONS 904,676   8/1962   United Kingdom ................... 83/835

*Primary Examiner*—Willie G. Abercrombie
*Attorney, Agent, or Firm*—Melvin A. Crosby

[57] ABSTRACT

A saw, especially for sawing wood, in which a support disc is provided with peripheral recesses with cutting teeth formed on the forwardly facing rearward sides of the recesses and which teeth may be in the form of hard wear resistant inserts. The cutting teeth are so designed that the kerf taken by the saw as it advances into the saw cut is spaced on both sides from the saw blade and also from the sides of the aforementioned cutting teeth radially inwardly from the tip ends thereof. The teeth are formed to present a positive cutting rake in all directions to the wood and shear the wood fibers off cleanly at the radially outer tip ends of the cutting teeth.

15 Claims, 8 Drawing Figures

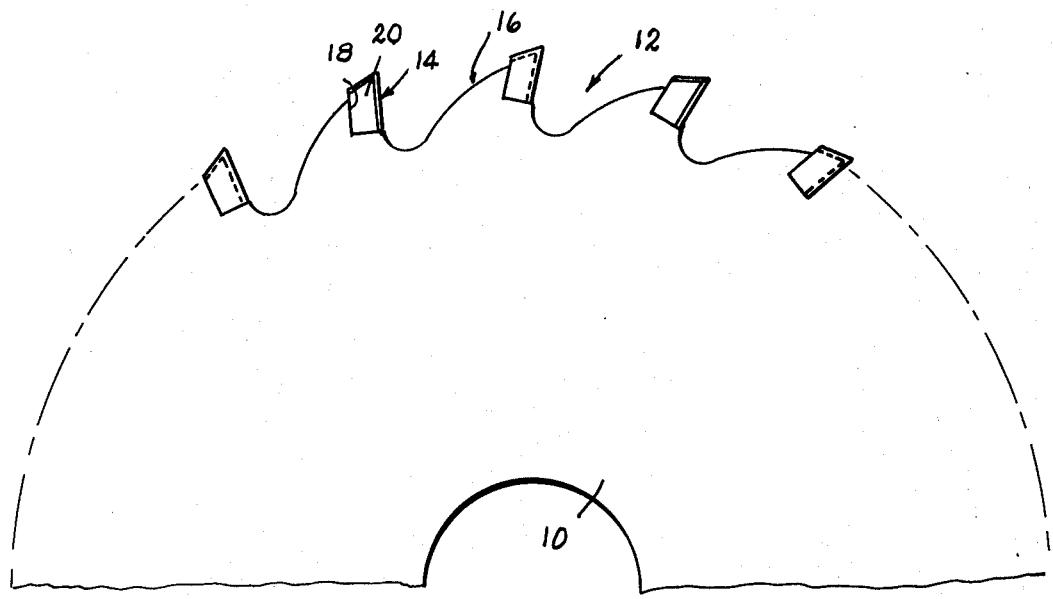
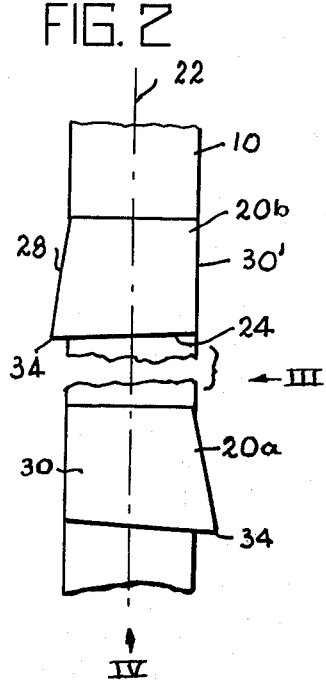
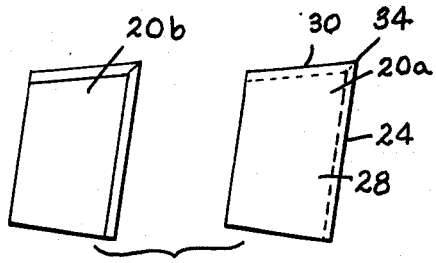
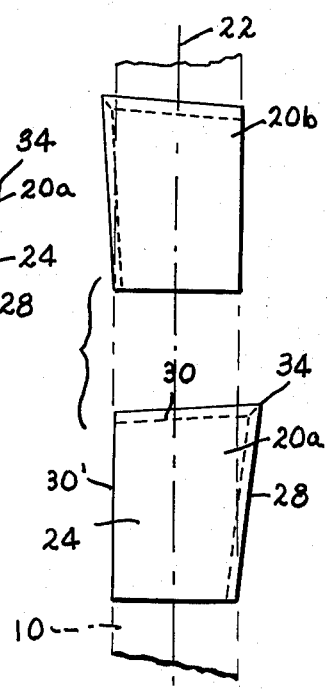

SAW

The present invention relates to saws, particularly to saws for sawing wood and like materials, and is particularly concerned with such a saw which cuts off the wood fibers cleanly and does not thereafter engage the ends of the cut off fibers.

Wood saws are know and are widely used. Heretofore, however, the surfaces formed by wood saws on a piece of wood has been defective in respect of providing for, in particular, the best possible conditions for making a glue joint.

Extensive test and experimentation has developed that a conventional wood saw, in addition to cutting through the wood and severing the wood fibers, also tends to bend the fibers over at the cut off ends. When those surfaces which have been cut by a saw according to the prior art are placed together with a glue layer interposed therebetween, a defective joining together of the wood pieces will sometimes result, not on account of any deficiency in the glue employed, but due to the fact that one or the other of the wood pieces will tend to split along a region closely adjacent the glue joint because of the aforementioned bruising and bending over of the fiber ends.

The tests and experimentation carried out have developed that a great many glues are satisfactory for connecting opposed sawed surfaces and that failure of such a joint, which is usually attributed to deficiencies in the glue, is more often due to deficiencies in the wood immediately adjacent the glue joint and which are created by the saw during sawing operations.

Heretofore, it has been the objective of making a saw cut to obtain the smoothest possible surface, but this can only be accomplished by engaging the walls of the kerf by the saw after the wood fibers have been cut and this damages the kerf walls with respect to the bending over and bruising of the wood fibers.

With the foregoing in mind, a primary objective of the present invention is the provision of a saw, especially for sawing wood and felt and other fibrous materials in which the saw teeth are so configured that the walls of the kerf being cut thereby are engaged only a single time by the saw teeth.

A still further object is the provision of a saw for sawing wood and felt and other fibrous materials in which the walls of the kerf taken by the saw are left in the best possible condition for establishing strong glue joints between opposed saw cut surfaces.

BRIEF SUMMARY OF THE INVENTION

According to the present invention, a saw is constructed by forming peripheral recesses about a flat planar disc-like support member. The forwardly facing side of each recess is substantially radial while the forward wall of each recess inclines forwardly in the radially outer direction so that the recesses are substantially conventional for rotary saw blades.

The radially outer end of the forwardly facing rearward wall of each recess is formed to present a cutting edge to a workpiece to be sawed. Since it is common practice to provide hard wear resistant inserts to form the cutting teeth, the present invention is described in respect of a saw having such inserts.

It will be understood, however, that inasmuch as wood and the like is much softer than the steel used in the manufacture of saw blades, the teeth of the saw could be formed directly thereon as integral parts of the metal disc which forms the saw blade.

When the teeth are provided by hard wear inserts, each forwardly facing wall of each recess is advantageously notched inwardly from the outer edge and mounted in each notch, as by brazing, is a hard wear resistant insert formed, for example, of cemented hard metal carbides such as cemented tungsten carbide.

Each insert is formed so as to have, at one side of the forwardly facing front wall at one side of the radially outer edge thereof, a pointed region which forms the cutting portion of the respective insert. The front wall of each insert inclines forwardly in the radially outer direction and rearwardly toward the axial side which is opposite the aforementioned pointed region. The side wall of the insert on the same side as the pointed region inclines axially outwardly in the radially outer direction and axially inwardly in the rearward direction.

Finally, the radially outer end of each insert inclines inwardly in the rearward direction and also may incline in a direction laterally away from said pointed region. Inserts of the nature described above are mounted in the support member at distributed points about the support member and interposed therebetween are other inserts constructed in the same way except forming mirror images of the first described inserts with reference to the central radial plane of the support member.

The side walls of the inserts opposite the side having the points thereon are closer to the central radial plane of the support member than are the aforementioned pointed ends. A saw having inserts mounted therein as described above, when rotated and advanced into a fibrous member to be cut, engages the fibrous member only at the pointed cutting regions of the inserts and, during continued advancing movement of the saw, does not again touch the walls of the kerf taken by the inserts.

In this manner, each point along each wall of the kerf taken by the saw is engaged only a single time and by the pointed cutting regions of the respective inserts so that a clean shearing action of the fibers of the material takes place with no further engagement of the sheared off fibers by any part of the saw structure.

The exact nature of the present invention will become more apparent upon reference to the following detailed specification taken in connection with the accompanying drawings in which:

FIG. 1 is a somewhat schematic partial side view showing a saw constructed according to the present invention.

FIG. 2 is a view looking down on the edge of the saw blade showing two consecutive inserts.

FIG. 3 is a diagrammatic view looking at the side of two consecutive inserts of the saw as indicated by arrow III on FIG. 2.

FIG. 4 is a schematic view looking in at the forward sides of two consecutive inserts.

DETAILED DESCRIPTION OF THE INVENTION

Figure 7:
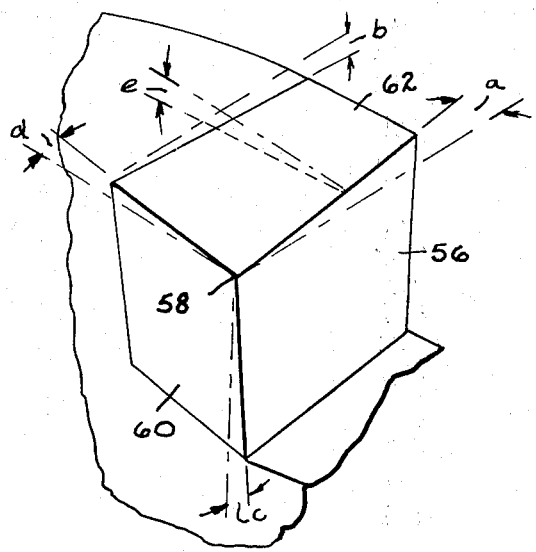
FIG. 7 is a perspective view of a typical saw cutting tooth.

Referring to the drawings somewhat more in detail, in FIG. 1, the body of the saw comprises a circular planar support disc 10 having peripheral recesses 12 formed therein with each recess having a substantially radial forwardly facing rear wall 14 and a forward wall 16 which inclines forwardly in the radially outward direction. Each forwardly facing rearward wall of each recess is advantageously formed with a notch 18 extending therein from the outer end and in each notch there is seated an insert 20 of hard wear resistant material, preferably, a cemented hard metal carbide such as tungsten carbide. Each insert is advantageously brazed in place so as to be fixedly connected to the support member forming the body of the saw.

FIGS. 2, 3 and 4 show more in detail the manner in which the inserts 20 are formed. The inserts shown in FIGS. 2, 3 and 4 are identified at 20a and 20b and each is the mirror image of the other with respect to the central radial plane of the disc-like support member 10, said radial plane being indicated at 22 in FIGS. 2 and 4. Since the inserts are mirror images of one another, a detailed description will be given only of insert 20a.

Each of the inserts 20a has a forwardly facing wall 24 which, as will be seen in FIG. 3, inclines forwardly with respect to the radius 26 of the support body passing through the radially outer edge of the said front wall. As will be seen in FIG. 2, each front wall 24 also inclines rearwardly in one axial direction. Each insert also has a side wall 28 which inclines toward the central plane of the support body in the rearward direction and also in the radially inward direction as will be seen in FIGS. 2 and 4.

Each insert, furthermore, has a radially outer end 30 which inclines radially inwardly in the rearward direction and which may also incline in the lateral direction, for example, radially inwardly in a direction away from side wall 28 as will best be seen in FIGS. 3 and 4. Each insert has a further side wall 32 on the side opposite side wall 28 which may be in about the plane of the respective side of support member 10.

The described arrangement provides for positive rake cutting conditions to exist in the region of the point 34 of each insert. Point 34, it will be appreciated, is disposed at the juncture of forwardly facing wall 24, side wall 28, and outer end wall 30.

Figure 5:
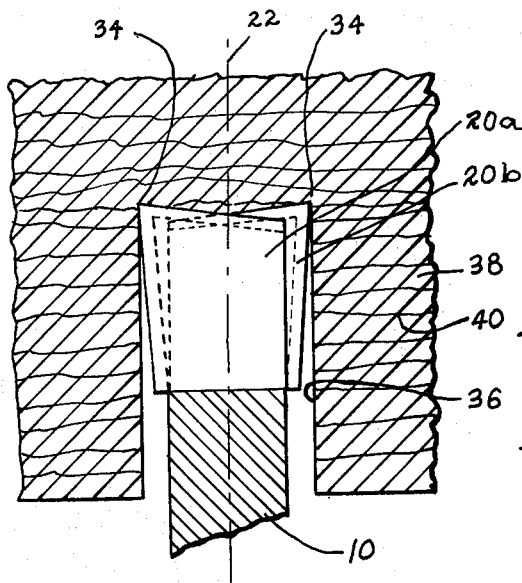
FIG. 5 is a schematic view drawn at enlarged scale and showing the forming of a kerf in a work member by a saw according to the present invention.

FIG. 5 shows in some detail the conditions which obtain within a kerf when a saw according to the present invention is advanced therein. FIG. 5 shows the support member 10 with inserts 20a and 20b thereon and disposed in the bottom of the kerf 36 being taken in a work member 38 which is a fibrous material such as wood. The inserts engage the side wall of the kerf only at the points 34 while the edges of the inserts at the juncture of the forwardly facing walls 24 and the radially outer end walls 30 cut the bottom of the kerf.

The side walls 36 of the kerf, however, are those regions which it is important to preserve with no bruising or bending over of the ends of the fibers of the workpiece being cut. The fibers are shown schematically at 40 in FIG. 5, and this view also schematically indicates that there is no bruising or bending over of the sheared off fibers which occurs with conventional saws which rub on the sides of the kerf following the actual severing of the fibers to be cut.

It will be understood that the saw could include other teeth interposed between the specially configured teeth which have been described above for the purpose of removing material from the bottom of the kerf if so desired.

It is found that a saw having teeth constructed according to the present invention can be advanced into a work member being cut more rapidly than is conventional practice. In the prior art, with conventional saws, it is the practice to advance into the work at a feed rate of about 0.003 to about 0.005 per tooth. The saw according to the present invention has been found to advance and to work quite satisfactorily at a feed rate of 0.010 inches per tooth.

A relatively high feed rate is important in respect of the present invention to prevent the saw for engaging the same surface more than a single time and with the special formation of the teeth of the saw according to the present invention the maintaining of a high feed rate per tooth presents no difficulties.

Figure 6:
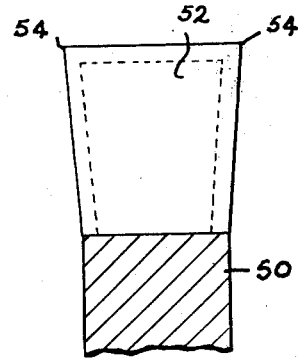
FIG. 6 shows a front view of a tooth arranged to cut on both sides at the radially outer end.

FIG. 6 shows a saw blade 50 having inserts 52 thereon which are formed with two cutting points 54 for cutting the sides of the kerf. FIG. 6 represents a possible construction of the saw especially when employing hard wear resistant inserts but may present problems in respect of grinding the insert when this becomes necessary. The forwardly facing side of the insert of FIG. 6 could be in the form of a wide angle V or be concave forwardly thereby to provide positive cutting rake conditions toward the front when the saw was in use.

FIG. 7 shows somewhat more in detail a typical saw blade insert. In FIG. 7, it will be seen that the forwardly facing side 56 of the insert inclines rearwardly in the lateral direction at an angle $a$ from cutting point 58 of the insert. The side wall 60 of the insert inclines inwardly in the radial direction at angle $c$ and inwardly in the rearward direction at angle $d$. The radially outer end face 62 of the insert inclines toward the axis of the saw in the lateral direction at the angle marked $b$ and in the front to back direction inclines inwardly at angle marked E.

As has been mentioned, the angles may range from about 5° to about 15°, and when provided, as shown, insure that the cutting point 58 is the only part of the saw blade that engages the kerf and the successive cutting edges around the saw each engage the kerf in one region only as the saw blade is fed into the work.

Figure 8:
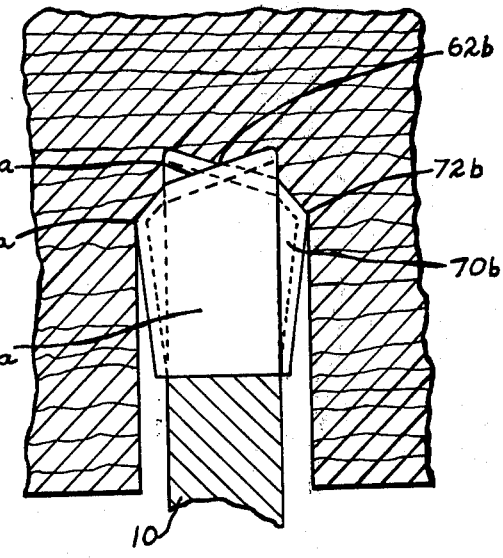
FIG. 8 is a view like FIG. 5, but shows another form which the saw teeth can take.

FIG. 8 is a view like FIG. 5 but shows how the radially outer ends 62a and 62b of the inserts 70a, 70b illustrated incline outwardly in the lateral direction from the respective cutting points 72a, 72b of the inserts. Teeth formed as shown in FIG. 8, whether formed from the material of the saw blade, or in the form of hard inserts mounted in the saw blade, have somewhat longer life because the cutting points are less fragile. The included angle between the radially outer end of the insert and the side wall of the insert which meet at the cutting point may vary and is shown as about 135 degrees. The portion of the radially outer end of the insert which is remote from the cutting point may be inclined at an angle to the axis of the saw which is less than 135° to eliminate a sharp corner at the side of the insert opposite the cutting point.

The saw of FIG. 8, however, still has the important feature of engaging each region of the kerf being formed by the saw a single time only as sawing proceeds.

Modifications may be made within the scope of the appended claims.

We claim:

1. In a saw, especially for sawing fibrous materials such as wood and the like; a circular planar support disc rotatable on a central axis perpendicular to the plane of the disc and having peripheral recesses with a generally radial forwardly facing surfaces, each forwardly facing surface of each recess being notched to receive an insert and a hard wear resistant insert fixed in each notch, each insert having a forward side and an outer end face and lateral sides, each insert having a cutting point at the juncture of said forward side and outer end face and one lateral side, said cutting point being disposed laterally and radially outside the range of said support member, each of said forward side and said outer end face and said one lateral side inclining inwardly in a direction away from said point at an angle of about 5° to 15°.

2. A saw according to claim 1 in which the other said lateral side is closer to the central radial plane of the support disc than said cutting point.

3. A saw according to claim 2 in which alternate ones of said inserts are formed as mirror images of the others thereof with respect to the central radial plane of said support disc to dispose cutting points on opposite sides of the support disc.

4. A saw according to claim 1 in which said forward side and outer end face and lateral sides of said insert are substantially planar and are relieved with reference to said cutting point by inclining of the planes thereof to establish positive rake cutting conditions in the radial and axial and circumferential directions at said cutting point.

5. A saw according to claim 1 in which the plane of said forward face of said insert inclines forwardly in the radially outward direction and rearwardly in the axial direction away from said cutting point, the plane of said outer end face inclining inwardly in the direction rearwardly from said cutting point, and the plane of said one lateral side inclining axially and radially inwardly rearwardly from said cutting point.

6. A saw according to claim 5 in which the plane of said outer end face of said insert also inclines inwardly in the axial direction away from said cutting point.

7. A saw according to claim 5 in which the plane of said outer end face also inclines outwardly in the axial direction away from said cutting point.

8. A method of sawing wood and like fibrous materials to produce a surface having cleanly cut fiber ends for gluing to a like surface, said method comprising; providing cutting teeth on the periphery of a saw body with each tooth having a cutting point defined by intersecting generally planar surfaces of the tooth body respectively, each cutting point being disposed axially outside the range of the saw body, inclining the surfaces of each tooth body which extend rearwardly and radially away from the respective cutting point and which meet at the cutting point from about 5° to about 15° in a direction to provide clearance behind the cutting point, rotating the saw body, and advancing the saw body in the plane thereof into a workpiece at a rate such that each region of the surface being cut is engaged a single time only by a said cutting point.

9. The method according to claim 8 in which the surface on the forward side of the cutting point is inclined forwardly in the radially outward direction.

10. The method according to claim 9 in which the surface on the forward side of the cutting point is also inclined rearwardly in the lateral direction away from said cutting point at an angle of from about 5° to about 15°.

11. The method according to claim 8 in which the rate of feed of the saw into the workpiece is about 0.010 inches per tooth.

12. The method of making a saw which will cut wood and like fibrous materials to produce a surface which is characterized by cleanly cut fiber ends, said method comprising; providing a saw body with circumferentially spaced inserts forming saw teeth, inclining one axial side wall of each insert outwardly in the radially outward direction from the adjacent side of the saw body to dispose one corner of the radially outer end of each insert outside the axial range of the saw body, inclining the axially outer side and the radially outer end of each insert rearwardly from said one corner at an angle of from about 5° to about 15° to form relieved regions rearwardly from said one corner whereby each insert presents a sharp corner to the work while being spaced from the work radially inwardly from the said corner, and forming the forward side of each insert to present positive rake cutting conditions to the work to be cut.

13. The method according to claim 18 in which some one axial side walls of alternate ones of said inserts are inclined outwardly from the saw body in one axial direction and the others of said inserts are inclined outwardly from the saw body in the opposite axial direction, the said insert corners on each side of the body being in respective planes parallel to the plane of the body.

14. The method according to claim 12 in which the radially outer end of each tooth inclines outwardly in the lateral direction away from said corner and terminates axially inwardly from the said corner of a tooth inclined in the opposite axial direction.

15. The method according to claim 12 in which the radially outer end of each tooth inclines inwardly in the lateral direction away from said corner and terminates axially inwardly from the said corner of a tooth inclined in the opposite axial direction.

* * * * *